(No Model.)
W. T. McGHEE.
ATTACHMENT FOR CORN PLANTERS.
No. 290,447. Patented Dec. 18, 1883.
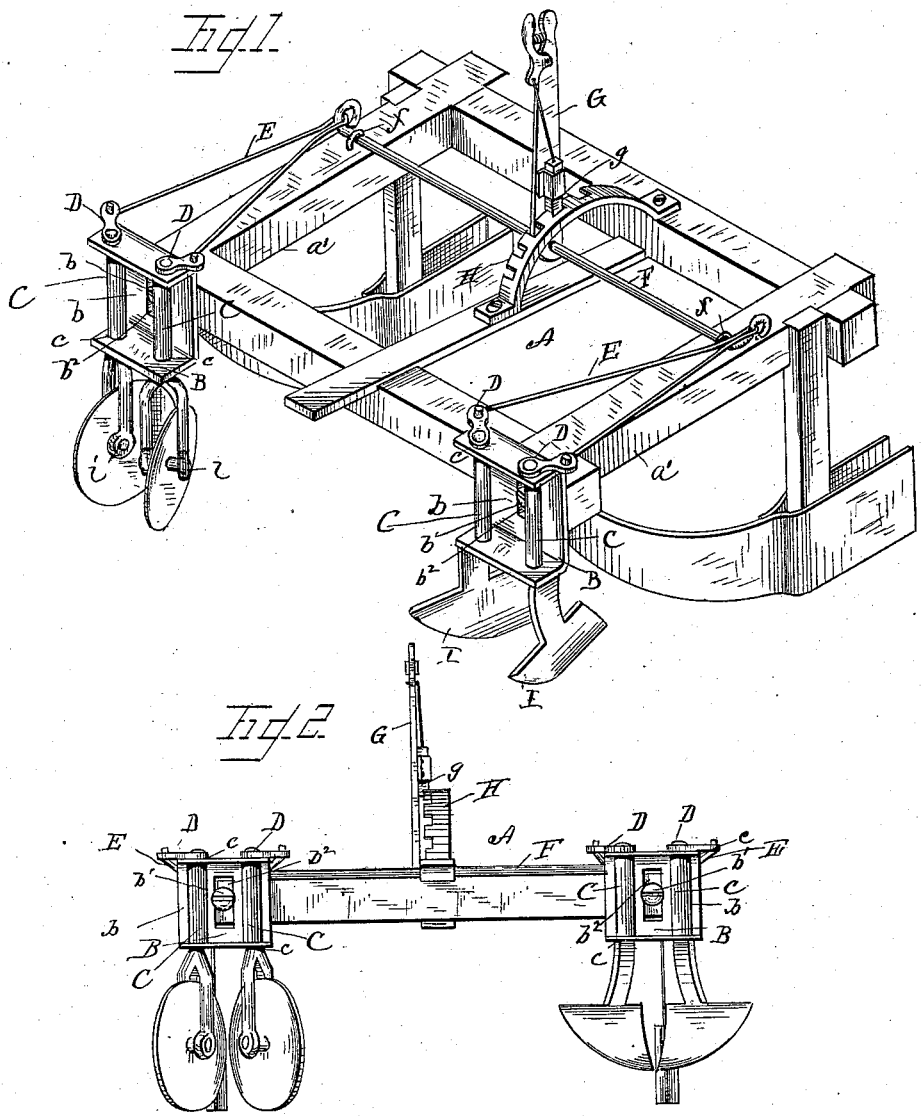
WITNESSES
INVENTOR
Wm. T. McGhee
by C. A. Snow & Co.
Attorneys

UNITED STATES PATENT OFFICE.

WILLIAM T. McGHEE, OF CHILLICOTHE, MISSOURI, ASSIGNOR OF ONE-HALF TO FREDRICK P. SNYDER, OF SAME PLACE.

ATTACHMENT FOR CORN-PLANTERS.

SPECIFICATION forming part of Letters Patent No. 290,447, dated December 18, 1883.

Application filed August 9, 1883. (No model.)

*To all whom it may concern:*

Be it known that I, WILLIAM T. MCGHEE, a citizen of the United States, residing at Chillicothe, in the county of Livingston and State of Missouri, have invented a new and useful Attachment for Corn-Planters, of which the following is a specification, reference being had to the accompanying drawings.

My invention relates to planting-machines, the object being to provide this class of machines with adjustable devices for forming hills to receive the corn or seed. Where the seed is dropped in furrows or depressions, water collects around the young plant and either materially damages or destroys it entirely. This serious difficulty I overcome by my improved attachment, which consists in the combination, with a planter-frame, of a pair of adjustable blades or disks adapted to form a hill in front of the dropping mechanism, and operated by a lever and suitable connections, as will be fully described hereinafter.

In the drawings, Figure 1 is a perspective view of the frame of a planter having my improvement applied thereto. Fig. 2 is a front elevation of the same.

A represents the planter-frame, having at each end of its forward cross-bar, a, a bracket-bearing, B, consisting of a vertically-adjustable plate, b, secured to the frame by a screw or bolt, b', passing through an elongated slot, b², of said plate. The upper and lower ends of the plate are bent forward at right angles to the center of the plate, and are formed with opposite bearings, c c, to receive vertical shafts or spindles C C, whose upper ends are provided with right-angular arms D D, to which are secured the forward ends of a V-shaped link, E, whose rear end is loosely secured to one end of a rock-shaft, F, supported by staple-bearings f f upon the side bars, a' a', of the planter-frame. Upon this shaft is secured an operating-lever, G, provided with a pivoted dog, g, adapted to engage a segmental rack, H, secured centrally upon the planter-frame. The lower ends of the spindles C C carry blades or disks I I. If revolving disks are employed, the lower ends of the spindles are forked and perforated (as shown at the left side of the machine in the drawings) to receive the shafts *i* of the disks. If blades are employed, they are preferably cast integral with the spindles C C, (as shown at the right side of the machine in the drawings.)

The operation of my improved attachments is as follows: The disks or blades are held together in front of the brackets B B by forcing the lever G backward, thus causing said blades or disks to collect the earth and form a hill or elevation. Then by moving the lever forward the rear portions of the disks or blades separate and leave the hill ready to receive the seed, when the operation is repeated.

It will be apparent that the hills will be formed in parallel and uniform rows, as the blades on each side are operated simultaneously.

I do not limit myself to the use of either the disks or shovels shown in the drawings, as other similar hill-forming devices may be used with the oscillating spindles.

Having fully described my invention, what I claim as new, and desire to secure by Letters Patent, is—

1. The combination, with the frame of a planting-machine, of bearings secured thereto, vertical shafts or spindles supported within said bearings, hill-forming devices secured to said spindles, and means for oscillating the spindles within their bearings, as and for the purpose set forth.

2. The combination, with the frame of a planting-machine, of bearings secured thereto, spindles supported within said bearings, hill-forming devices secured to said spindles, a rock-shaft supported upon the planter-frame, and devices for connecting said spindles and shaft and for oscillating said spindles, substantially as set forth.

3. The combination, with the frame of a planting-machine, of bracket-bearings adjustably secured to the front of said frame, oscillating spindles supported in said bearings and carrying hill-formers, arms secured to the upper ends of said spindles, and V-shaped links connecting said arms with a rock-shaft, substantially as set forth.

4. The combination, with the frame of a planting-machine, of a bracket-bearing secured at each end of the front of said frame, a pair of oscillating spindles supported in each of said bearings, hill-formers secured to said spindles, a rock-shaft, links and arms connecting said spindles and shaft, and an operating-lever for simultaneously operating both pairs of spindles, and a dog adapted to engage a segmental rack, substantially as set forth.

In testimony that I claim the foregoing as my own I have hereto affixed my signature in presence of two witnesses.

WILLIAM T. McGHEE.

Witnesses:
W. F. NORVILL,
W. P. MUNRO.